(12) United States Patent
Li et al.

(10) Patent No.: US 9,251,813 B1
(45) Date of Patent: Feb. 2, 2016

(54) METHOD OF MAKING A MAGNETIC RECORDING HEAD

(71) Applicant: Western Digital (Fremont), LLC, Fremont, CA (US)

(72) Inventors: Shaoping Li, San Ramon, CA (US); Ge Yi, San Ramon, CA (US); Feng Liu, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 390 days.

(21) Appl. No.: 13/765,161

(22) Filed: Feb. 12, 2013

Related U.S. Application Data (62) Division of application No. 12/426,264, filed on Apr. 19, 2009, now Pat. No. 8,400,731.

(51) Int. Cl.
*G11B 5/127* (2006.01)
*H04R 31/00* (2006.01)
*G11B 5/147* (2006.01)

(52) U.S. Cl.
CPC ......... *G11B 5/1475* (2013.01); *Y10T 29/49021* (2015.01); *Y10T 29/49039* (2015.01)

(58) Field of Classification Search
CPC ...... G11B 5/3163; G11B 5/315; G11B 5/112; Y10T 29/49032; Y10T 29/49021; Y10T 29/49039
USPC ............... 29/603.13, 603.11, 603.14, 603.15, 29/603.16, 603.18; 360/119.04, 122, 360/125.01, 125.25
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |

(Continued)

OTHER PUBLICATIONS

Mallary et al., "One Terabit per Square Inch Perpendicular Recording Conceptual Design", IEEE Transactions on Magnetics, vol. 38, No. 4, Jul. 2002, pp. 1719-1724.

*Primary Examiner* — Thiem Phan (57) ABSTRACT

A magnetic recording head comprises a write pole including a throat region with a leading edge, a trailing edge opposite the leading edge, and first and second side edges opposite one another. The magnetic recording head further comprises a first side wall gap layer disposed alongside the first side edge of the throat region, and a second side wall gap layer disposed alongside the second side edge of the throat region. Each of the first and second side wall gap layers has a first width at the leading edge of the throat region smaller than a second width at the trailing edge of the throat region.

10 Claims, 5 Drawing Sheets

(56) References Cited

U.S. PATENT DOCUMENTS

| | | |
|---|---|---|
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |

(56) References Cited

U.S. PATENT DOCUMENTS

| | | |
|---|---|---|
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,002,775 B2 | 2/2006 | Hsu et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,324,304 B1 | 1/2008 | Benakli et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,367,112 B2 | 5/2008 | Nix et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,467,461 B2 | 12/2008 | Bonhote et al. |
| 7,493,688 B1 | 2/2009 | Wang et al. |

(56) References Cited

U.S. PATENT DOCUMENTS

| | | |
|---|---|---|
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,649,712 B2 | 1/2010 | Le et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,768,743 B2 | 8/2010 | Guthrie et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,920,359 B2 | 4/2011 | Maruyama et al. |
| 7,968,219 B1 | 6/2011 | Jiang et al. |
| 7,979,978 B2 | 7/2011 | Han et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,120,874 B2 | 2/2012 | Hsiao et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |

(56) References Cited

U.S. PATENT DOCUMENTS

| | | | |
|---|---|---|---|
| 8,419,954 | B1 | 4/2013 | Chen et al. |
| 8,422,176 | B1 | 4/2013 | Leng et al. |
| 8,422,342 | B1 | 4/2013 | Lee |
| 8,422,841 | B1 | 4/2013 | Shi et al. |
| 8,424,192 | B1 | 4/2013 | Yang et al. |
| 8,441,756 | B1 | 5/2013 | Sun et al. |
| 8,443,510 | B1 | 5/2013 | Shi et al. |
| 8,444,866 | B1 | 5/2013 | Guan et al. |
| 8,449,948 | B2 | 5/2013 | Medina et al. |
| 8,451,556 | B1 | 5/2013 | Wang et al. |
| 8,451,563 | B1 | 5/2013 | Zhang et al. |
| 8,454,846 | B1 | 6/2013 | Zhou et al. |
| 8,455,119 | B1 | 6/2013 | Jiang et al. |
| 8,456,961 | B1 | 6/2013 | Wang et al. |
| 8,456,963 | B1 | 6/2013 | Hu et al. |
| 8,456,964 | B1 | 6/2013 | Yuan et al. |
| 8,456,966 | B1 | 6/2013 | Shi et al. |
| 8,456,967 | B1 | 6/2013 | Mallary |
| 8,458,892 | B2 | 6/2013 | Si et al. |
| 8,462,592 | B1 | 6/2013 | Wolf et al. |
| 8,468,682 | B1 | 6/2013 | Zhang |
| 8,472,288 | B1 | 6/2013 | Wolf et al. |
| 8,480,911 | B1 | 7/2013 | Osugi et al. |
| 8,486,285 | B2 | 7/2013 | Zhou et al. |
| 8,486,286 | B1 | 7/2013 | Gao et al. |
| 8,488,272 | B1 | 7/2013 | Tran et al. |
| 8,491,801 | B1 | 7/2013 | Tanner et al. |
| 8,491,802 | B1 | 7/2013 | Gao et al. |
| 8,493,693 | B1 | 7/2013 | Zheng et al. |
| 8,493,695 | B1 | 7/2013 | Kaiser et al. |
| 8,495,813 | B1 | 7/2013 | Hu et al. |
| 8,498,084 | B1 | 7/2013 | Leng et al. |
| 8,506,828 | B1 | 8/2013 | Osugi et al. |
| 8,514,517 | B1 | 8/2013 | Batra et al. |
| 8,518,279 | B1 | 8/2013 | Wang et al. |
| 8,518,832 | B1 | 8/2013 | Yang et al. |
| 8,520,336 | B1 | 8/2013 | Liu et al. |
| 8,520,337 | B1 | 8/2013 | Liu et al. |
| 8,524,068 | B2 | 9/2013 | Medina et al. |
| 8,526,275 | B1 | 9/2013 | Yuan et al. |
| 8,531,801 | B1 | 9/2013 | Xiao et al. |
| 8,532,450 | B1 | 9/2013 | Wang et al. |
| 8,533,937 | B1 | 9/2013 | Wang et al. |
| 8,537,494 | B1 | 9/2013 | Pan et al. |
| 8,537,495 | B1 | 9/2013 | Luo et al. |
| 8,537,502 | B1 | 9/2013 | Park et al. |
| 8,545,999 | B1 | 10/2013 | Leng et al. |
| 8,547,659 | B1 | 10/2013 | Bai et al. |
| 8,547,667 | B1 | 10/2013 | Roy et al. |
| 8,547,730 | B1 | 10/2013 | Shen et al. |
| 8,555,486 | B1 | 10/2013 | Medina et al. |
| 8,559,141 | B1 | 10/2013 | Pakala et al. |
| 8,563,146 | B1 | 10/2013 | Zhang et al. |
| 8,565,049 | B1 | 10/2013 | Tanner et al. |
| 8,576,517 | B1 | 11/2013 | Tran et al. |
| 8,578,594 | B2 | 11/2013 | Jiang et al. |
| 8,582,238 | B1 | 11/2013 | Liu et al. |
| 8,582,241 | B1 | 11/2013 | Yu et al. |
| 8,582,253 | B1 | 11/2013 | Zheng et al. |
| 8,588,039 | B1 | 11/2013 | Shi et al. |
| 8,593,914 | B2 | 11/2013 | Wang et al. |
| 8,597,528 | B1 | 12/2013 | Roy et al. |
| 8,599,520 | B1 | 12/2013 | Liu et al. |
| 8,599,657 | B1 | 12/2013 | Lee |
| 8,603,593 | B1 | 12/2013 | Roy et al. |
| 8,607,438 | B1 | 12/2013 | Gao et al. |
| 8,607,439 | B1 | 12/2013 | Wang et al. |
| 8,611,035 | B1 | 12/2013 | Bajikar et al. |
| 8,611,054 | B1 | 12/2013 | Shang et al. |
| 8,611,055 | B1 | 12/2013 | Pakala et al. |
| 8,614,864 | B1 | 12/2013 | Hong et al. |
| 8,619,512 | B1 | 12/2013 | Yuan et al. |
| 8,625,233 | B1 | 1/2014 | Ji et al. |
| 8,625,941 | B1 | 1/2014 | Shi et al. |
| 8,628,672 | B1 | 1/2014 | Si et al. |
| 8,630,068 | B1 | 1/2014 | Mauri et al. |
| 8,634,280 | B1 | 1/2014 | Wang et al. |
| 8,638,529 | B1 | 1/2014 | Leng et al. |
| 8,643,980 | B1 | 2/2014 | Fowler et al. |
| 8,649,123 | B1 | 2/2014 | Zhang et al. |
| 8,665,561 | B1 | 3/2014 | Knutson et al. |
| 8,670,211 | B1 | 3/2014 | Sun et al. |
| 8,670,213 | B1 | 3/2014 | Zeng et al. |
| 8,670,214 | B1 | 3/2014 | Knutson et al. |
| 8,670,294 | B1 | 3/2014 | Shi et al. |
| 8,670,295 | B1 | 3/2014 | Hu et al. |
| 8,675,318 | B1 | 3/2014 | Ho et al. |
| 8,675,455 | B1 | 3/2014 | Krichevsky et al. |
| 8,681,594 | B1 | 3/2014 | Shi et al. |
| 8,689,430 | B1 | 4/2014 | Chen et al. |
| 8,693,141 | B1 | 4/2014 | Elliott et al. |
| 8,703,397 | B1 | 4/2014 | Zeng et al. |
| 8,705,205 | B1 | 4/2014 | Li et al. |
| 8,711,518 | B1 | 4/2014 | Zeng et al. |
| 8,711,528 | B1 | 4/2014 | Xiao et al. |
| 8,717,709 | B1 | 5/2014 | Shi et al. |
| 8,720,044 | B1 | 5/2014 | Tran et al. |
| 8,721,902 | B1 | 5/2014 | Wang et al. |
| 8,724,259 | B1 | 5/2014 | Liu et al. |
| 8,749,790 | B1 | 6/2014 | Tanner et al. |
| 8,749,920 | B1 | 6/2014 | Knutson et al. |
| 8,753,903 | B1 | 6/2014 | Tanner et al. |
| 8,760,807 | B1 | 6/2014 | Zhang et al. |
| 8,760,818 | B1 | 6/2014 | Diao et al. |
| 8,760,819 | B1 | 6/2014 | Liu et al. |
| 8,760,822 | B1 | 6/2014 | Li et al. |
| 8,760,823 | B1 | 6/2014 | Chen et al. |
| 8,763,235 | B1 | 7/2014 | Wang et al. |
| 8,780,498 | B1 | 7/2014 | Jiang et al. |
| 8,780,505 | B1 | 7/2014 | Xiao |
| 8,786,983 | B1 | 7/2014 | Liu et al. |
| 8,790,524 | B1 | 7/2014 | Luo et al. |
| 8,790,527 | B1 | 7/2014 | Luo et al. |
| 8,792,208 | B1 | 7/2014 | Liu et al. |
| 8,792,312 | B1 | 7/2014 | Wang et al. |
| 8,793,866 | B1 | 8/2014 | Zhang et al. |
| 8,797,680 | B1 | 8/2014 | Luo et al. |
| 8,797,684 | B1 | 8/2014 | Tran et al. |
| 8,797,686 | B1 | 8/2014 | Bai et al. |
| 8,797,692 | B1 | 8/2014 | Guo et al. |
| 8,813,324 | B2 | 8/2014 | Emley et al. |
| 2006/0044681 | A1 | 3/2006 | Le et al. |
| 2006/0044682 | A1 | 3/2006 | Le et al. |
| 2006/0067005 | A1 | 3/2006 | Jayasekara |
| 2006/0082924 | A1 | 4/2006 | Etoh et al. |
| 2007/0253107 | A1 | 11/2007 | Mochizuki et al. |
| 2008/0151437 | A1 | 6/2008 | Chen et al. |
| 2008/0180861 | A1 | 7/2008 | Maruyama et al. |
| 2008/0253035 | A1 | 10/2008 | Han et al. |
| 2008/0273276 | A1 | 11/2008 | Guan |
| 2008/0273277 | A1 | 11/2008 | Guan et al. |
| 2008/0278861 | A1 | 11/2008 | Jiang et al. |
| 2008/0304186 | A1 | 12/2008 | Watanabe et al. |
| 2009/0091861 | A1 | 4/2009 | Takano et al. |
| 2009/0154019 | A1 | 6/2009 | Hsiao et al. |
| 2009/0154026 | A1 | 6/2009 | Jiang et al. |
| 2009/0168241 | A1 | 7/2009 | Mochizuki et al. |
| 2010/0061016 | A1 | 3/2010 | Han et al. |
| 2010/0155363 | A1 | 6/2010 | Pentek et al. |
| 2010/0290157 | A1 | 11/2010 | Zhang et al. |
| 2010/0302681 | A1 | 12/2010 | Mino et al. |
| 2011/0086240 | A1 | 4/2011 | Xiang et al. |
| 2012/0012555 | A1 | 1/2012 | Yan et al. |
| 2012/0111826 | A1 | 5/2012 | Chen et al. |
| 2012/0216378 | A1 | 8/2012 | Emley et al. |
| 2012/0237878 | A1 | 9/2012 | Zeng et al. |
| 2012/0298621 | A1 | 11/2012 | Gao |
| 2013/0216702 | A1 | 8/2013 | Kaiser et al. |
| 2013/0216863 | A1 | 8/2013 | Li et al. |
| 2013/0257421 | A1 | 10/2013 | Shang et al. |
| 2014/0154529 | A1 | 6/2014 | Yang et al. |
| 2014/0175050 | A1 | 6/2014 | Zhang et al. |

METHOD OF MAKING A MAGNETIC RECORDING HEAD

CROSS-REFERENCE TO RELATED APPLICATIONS

This application is a divisional of U.S. patent application Ser. No. 12/426,264, filed on Apr. 19, 2009, which is hereby incorporated by reference in its entirety.

FIELD OF THE INVENTION

The present invention generally relates to hard disk drives and, in particular, relates to a write head with variable side shield gaps.

BACKGROUND OF THE INVENTION

In order to increase the recording density of magnetic storage devices, the performance of the write head of a hard disk drive plays an increasingly important role. Current writers with trailing shields suffer from several major shortcomings. For example, the cross-track field gradients of such write heads are poor, which can result in adjacent track interference (ATI). In this regard, writers with trailing shields tend to have large stray fields, which can result in adjacent track erasure. One approach to solving this ATI issue involves providing "wrap-around" shields, in which additional shield layers are disposed on opposite sides of the write head in the cross-track direction. While many side shield configurations have been proposed, most present design and fabrication challenges, while still suffering from an unsatisfactory level of ATI.

SUMMARY OF THE INVENTION

Various embodiments of the present invention solve the foregoing problem by providing magnetic recording heads having variable side shield gaps, whereby a trailing edge of a side shield is spaced further (in the cross-track direction) from the magnetic pole than a leading edge thereof. This configuration enjoys improved cross-track field gradients, can be accomplished with mill & lap or damascene process flows, is compatible with beveled heads, and may permit the use of more easily-fabricated rectangular cross-sectional write poles.

According to one aspect of the subject disclosure, a magnetic recording head is provided. The magnetic recording head comprises a write pole including a throat region with a leading edge, a trailing edge opposite the leading edge, and first and second side edges opposite one another. The magnetic recording head further comprises a first side wall gap layer disposed alongside the first side edge of the throat region, and a second side wall gap layer disposed alongside the second side edge of the throat region. Each of the first and second side wall gap layers has a first width at the leading edge of the throat region smaller than a second width at the trailing edge of the throat region.

According to another aspect of the subject disclosure, a method of making a magnetic recording head comprises the steps of forming a write pole extending above a field area, forming shadowing structures on opposite sides of the write pole, and depositing a side wall gap material onto opposing faces of the write pole, whereby side wall gap layers are formed on the opposing faces of the writer pole. The shadowing structures are configured to shadow a lower portion of the write pole such that the deposited side wall gap layers are thinner adjacent the lower portion and thicker adjacent a region above the lower portion.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
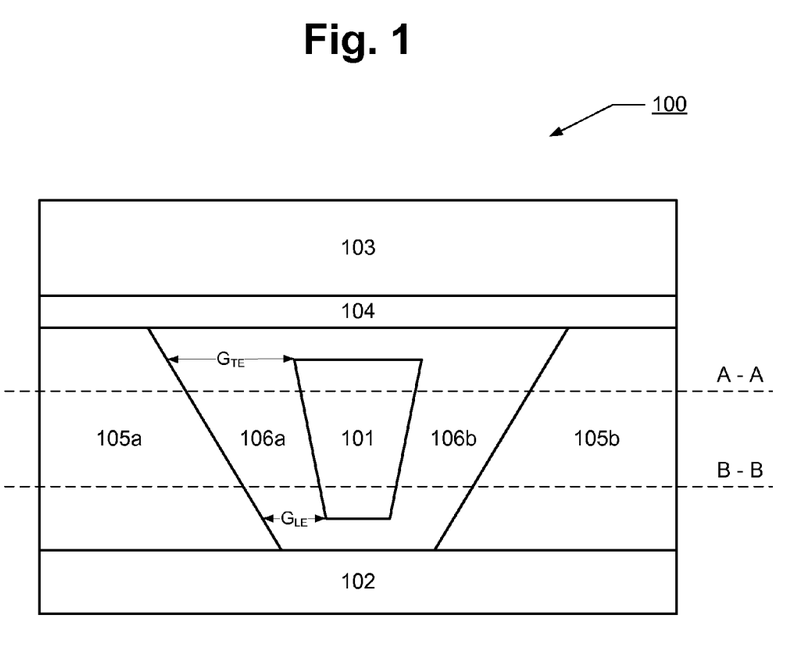
FIG. 1 illustrates a cross-sectional view of a magnetic recording head in accordance with one aspect of the subject disclosure.

FIG. 1 illustrates a cross-sectional view (from the perspective of the air bearing surface) of a magnetic recording head 100 in accordance with one aspect of the subject disclosure. Magnetic recording head includes a write pole 101 surrounded by a leading shield 102 and a trailing shield 103. Magnetic recording head may further include a write gap layer 104 separating a trailing edge of write pole 101 from trailing shield 103. Write pole 101 is further surrounded (in the cross-track direction) by two side shields 105a and 105b. Separating write pole 101 from side shields 105a and 105b are side gap layers 106a and 106b, respectively. As can be seen with reference to FIG. 1, each side gap layer is wider at the trailing edge of write pole 101 than at the leading edge thereof. In particular, at the trailing edge of write pole 101, side gap layer 106a has a width $G_{TE}$, and at the leading edge of write pole 101, side gap layer 106a has a width $G_{LE}$, where $G_{TE} > G_{LE}$. Side gap layer 106b is similarly configured, mirroring side gap layer 106a.

According to one aspect of the subject disclosure, $G_{TE}$ may be between 4 and 8 times the write gap of the magnetic recording head, while $G_{LE}$ may be between 2 and 3.5 times the write gap of the magnetic recording head. The scope of the present invention is not limited to these particular dimensions, however, as a write pole may be provided with variable side gap layers of nearly any ratio of sizes.

Figure 2A:
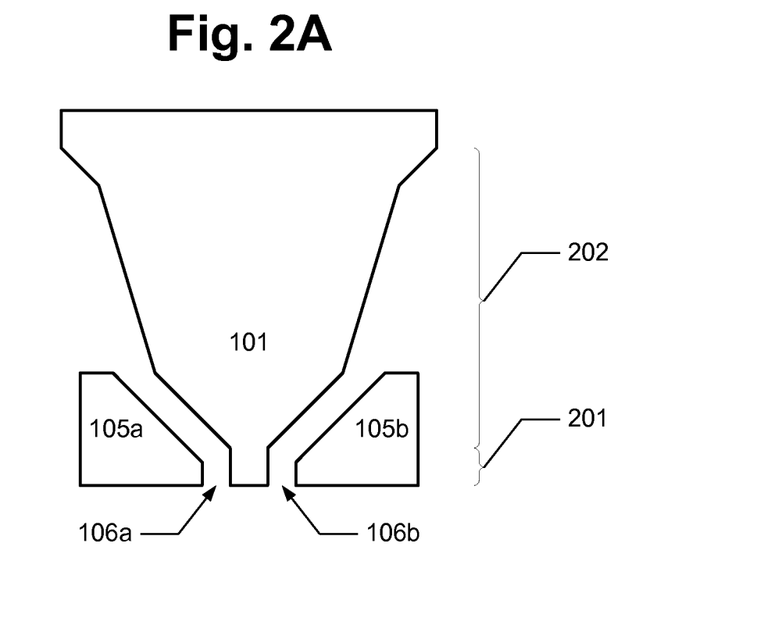
FIGS. 2A and 2B illustrate cross-sectional views of a magnetic recording head in accordance with one aspect of the subject disclosure.
Figure 2B:
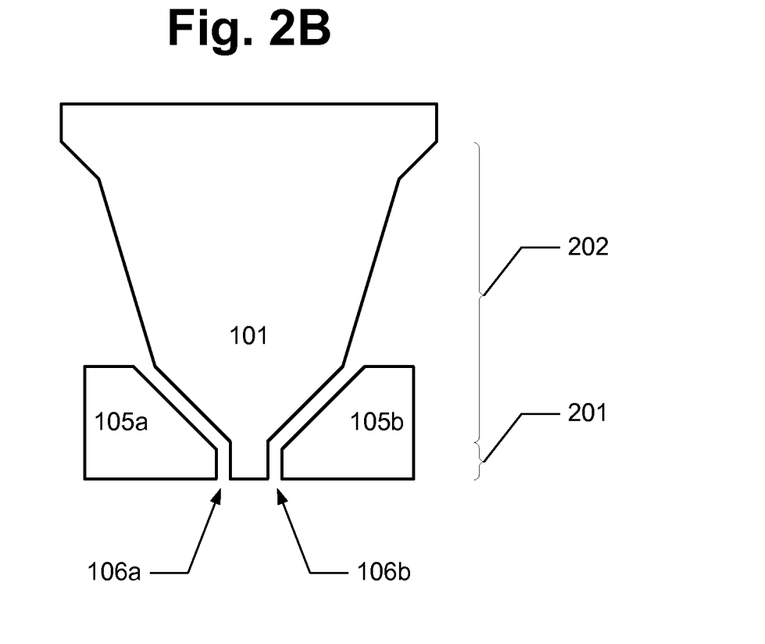

The variable width side gap layers 105a and 105b extend away from the air bearing surface (e.g., along the nose length of write pole 101), as can be seen with reference to FIGS. 2A and 2B, which illustrate magnetic recording head 100 in cross-section along planes A-A and B-B, respectively, in accordance with one aspect of the subject disclosure. As can be seen when comparing FIG. 2A to FIG. 2B, side gap layers 106a and 106b are wider nearer the trailing edge of write pole 101 (e.g., in FIG. 2A) than they are near the leading edge of write pole 101 (e.g., in FIG. 2B).

According to one aspect of the subject disclosure, the side shields 105a and 105b extend along a throat region 201 of write pole 201 and partway along a yoke region 202 thereof. Accordingly, as can be seen with reference to FIGS. 2A and 2B, variable width side gap layers 106a and 106b also extend along the throat region 201 and partway along the yoke region 202 of write pole 101, conformal with write pole 101.

According to one aspect of the subject disclosure, side gap layers 106a and 106b are symmetric (e.g., mirror images of one another). The scope of the present invention is not limited to such an arrangement, however, as a magnetic recording head may comprise a write pole surrounded by side gap layers of differently varying widths. Moreover, while the foregoing exemplary magnetic recording head is illustrated as having side gap layers with linearly increasing width from the leading edge to the trailing edge, the scope of the present invention is not limited to such an arrangement. Rather, magnetic recording heads may comprise a write pole surrounded by side gap layers that increase in width from the leading edge to the trailing edge non-linearly, discontinuously (e.g., in steps, or with regions of lesser width between regions of greater width), or in any number of other manners readily understood by those of skill in the art.

A magnetic recording head configured with a write pole surrounded by side gap layers of varying width, such as magnetic recording head 100, enjoys a number of performance advantages and ease of manufacture when compared with other magnetic recording head designs. For example, the larger side gap layer at the trailing edge of the write pole ensures that more magnetic flux passes through the leading edge regions of the side shields during an operation of the magnetic recording head than through the trailing edge regions thereof. Such an effect makes it possible to use a write pole with a rectangular cross-section (as viewed from the ABS) with a head field bubble similar to that of a trapezoidal cross-sectional pole which lacks the variable side shield gap layers. As will be readily understood by those of requisite skill in the art, a write pole with a rectangular cross section is far simpler to manufacture using simpler wafer fabrication techniques.

Figure 3A:
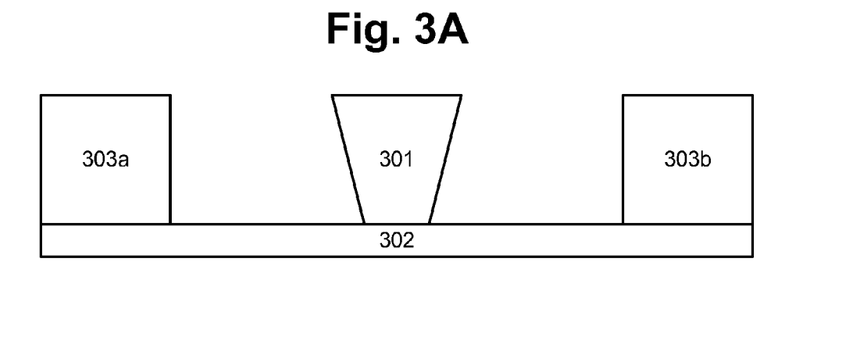
FIGS. 3A-3C graphically illustrate a method of making a magnetic recording head in accordance with one aspect of the subject disclosure.
Figure 3B:
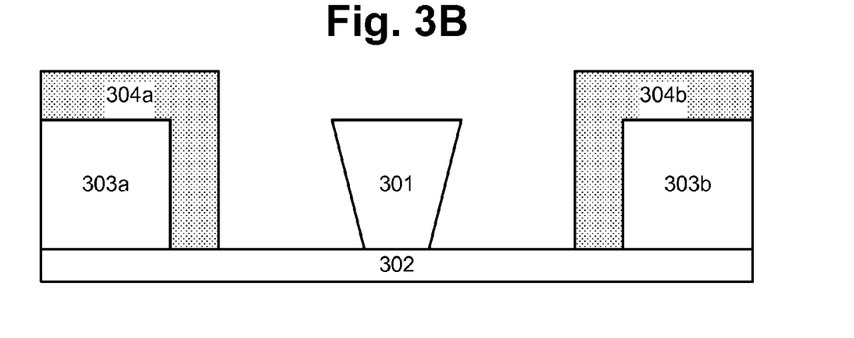
Figure 3C:
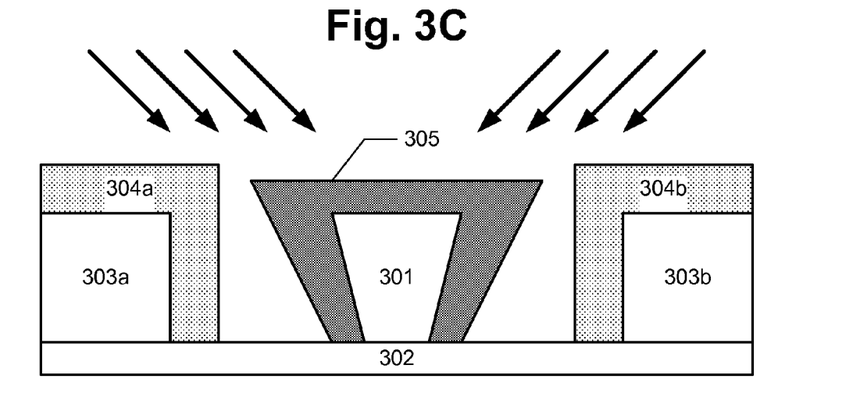

Turning to FIGS. 3A-3C, a method of making a magnetic recording head is graphically illustrated in accordance with one aspect of the subject disclosure. In FIG. 3A, a write pole 301 is illustrated in cross section (from an ABS view). Write pole 301 is formed over substrate 302 (e.g., by a damascene process, or by an additive "mill and lap" process). On either side of write pole 301 are illustrated regions of magnetic pole material from which write pole 301 has been formed, which regions 303a and 303b have not been stripped away from the wafer. It should be noted that FIG. 3A is not illustrated to scale, as the field area between write pole 301 and regions 303a and 303b may be many orders of magnitude larger than is illustrated in FIG. 3A. To facilitate the formation of variable side gap layers on write pole 301, shadowing structures 304a and 304b are formed on opposite sides thereof, as illustrated in FIG. 3B. These shadowing structures will allow a side gap material to be preferentially deposited on upper regions of write pole 301, as illustrated in FIG. 3C. The shadowing structures 304a and 304b may be formed by spin coating a photoresist material, or may be any other suitable material known to those of skill in the art, and may be formed on opposite sides of write pole 301 by any one of a number of methods well known to those of skill in the art. Moreover, it is not necessary that shadowing structures 304a and 304b be formed over pre-existing regions of the magnetic pole material layer, and may be formed directly upon substrate 302.

FIG. 3C illustrates the deposition of a side gap material 305 on either side of trapezoidal write pole 301 (and over the top of write pole 301, where side gap material 305 may be left to function as a write gap material, or from where side gap material 305 may be removed in a subsequent processing step). As can be seen with reference to FIG. 3C, the shadowing structures have partially shadowed lower regions of write pole 301, such that side gap material 305 has been preferentially deposited on upper regions of write pole 301, whereby the width of side gap material 305 at a trailing edge (the upper edge in FIG. 3C) of write pole 301 is greater than a width of side gap material 305 at a leading edge (the lower edge in FIG. 3C) of write pole 301. According to one aspect of the subject disclosure, following the deposition of the variable side gap layers on write pole 301, subsequent processing steps may provide write pole 301 with a beveled upper surface, without negatively impacting the variable side gap layers.

While in the foregoing exemplary embodiments, the write pole has been illustrated as trapezoidal, the scope of the present invention is not limited to such an arrangement. Rather, as will be readily understood by those of skill in the art, the present invention has application to write poles with any one of a number of cross-sectional shapes, including trapezoidal, triangular, rectangular, and any other cross-sectional shape known by those of skill in the art to be suitable for a write pole.

Figure 4:
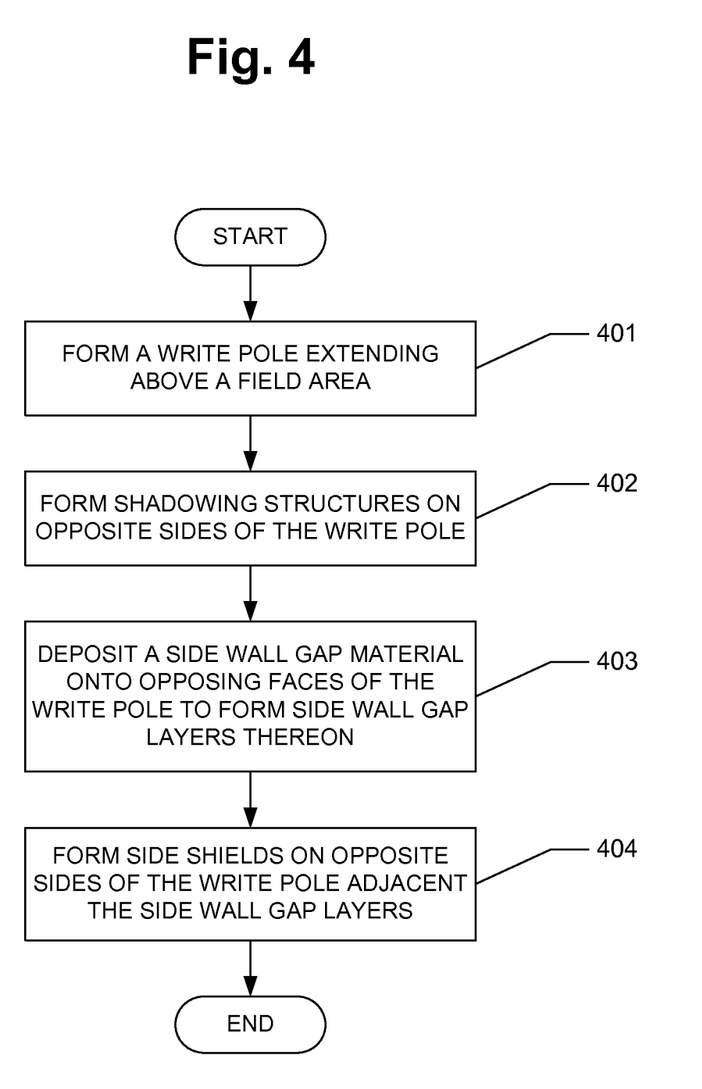
FIG. 4 is a flow chart illustrating a method of making a magnetic recording head in accordance with one aspect of the subject disclosure.

FIG. 4 is a flow chart illustrating a method of making a magnetic recording head in accordance with one aspect of the subject disclosure. The method begins in step 401, in which a write pole is formed extending above a field area. In step 402, shadowing structures are formed on opposite sides of the write pole. A side wall gap material is deposited onto opposing faces of the write pole in step 403, whereby side wall gap layers are formed on the opposing faces of the writer pole. The shadowing structures are configured to shadow a lower portion of the write pole such that the deposited side wall gap layers are thinner adjacent the lower portion and thicker adjacent a region above the lower portion.

Figure 5A:
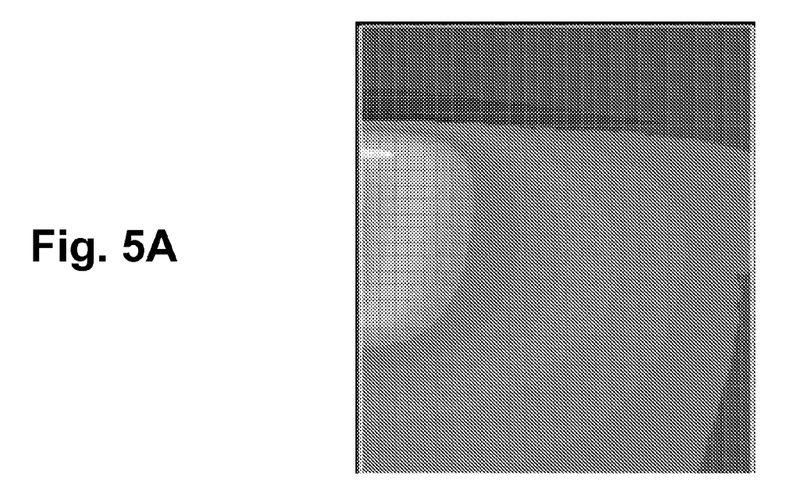
FIGS. 5A and 5B are FEM field contours of write heads with and without variable side shield gaps, in accordance with one aspect of the subject disclosure.
Figure 5B:
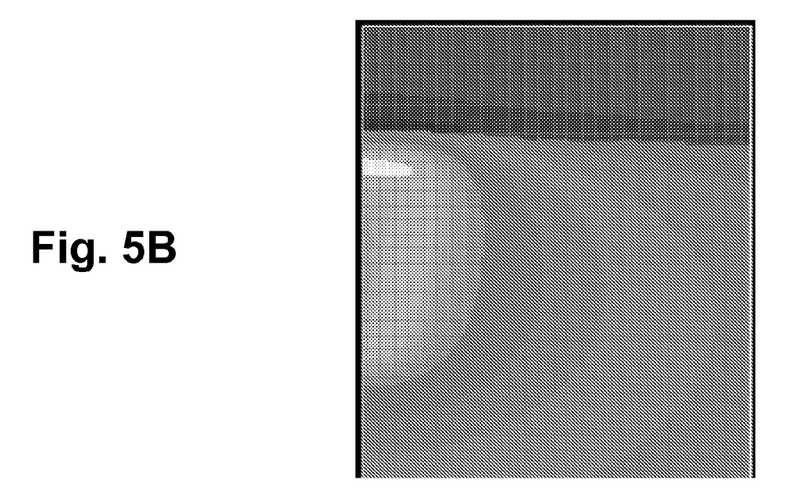

FIGS. 5A and 5B are FEM field contours of write heads with and without variable side shield gaps, respectively, in accordance with one aspect of the subject disclosure. As can be seen when comparing FIG. 5A (the FEM field contour of a write head with variable side shield gaps) to FIG. 5B, the FEM field contour of FIG. 5A has a much improved field gradient in the cross-track direction, which provides for greatly improved ATI performance.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of making a magnetic recording head, comprising the steps of:

forming a write pole extending above a field area;

forming shadowing structures on opposite sides of the write pole;

depositing a side wall gap material onto opposing faces of the write pole in at least a throat region, whereby side wall gap layers are formed on the opposing faces of the writer pole; and forming side shields on opposite sides of the write pole adjacent the side wall gap layers, the side shields extending at least from a leading edge to a trailing edge;

wherein the shadowing structures are configured to shadow a lower portion of the write pole such that the deposited side wall gap layers are thinner adjacent the lower portion and thicker adjacent a region above the lower portion and such that a width of the deposited side wall gap layers monotonically increases from the leading edge of the throat region to the trailing edge of the throat region.

2. The method of claim 1, wherein forming the write pole comprises forming a damascene trench in a sacrificial layer, plating a pole material into the damascene trench and removing the sacrificial layer.

3. The method of claim 1, wherein the step of forming the write pole comprises milling the write pole from a layer of write pole material.

4. The method of claim 1, wherein the shadowing structures comprise a photoresist material.

5. The method of claim 1, wherein the shadowing structures are separated from the write pole by a region of field area.

6. The method of claim 1, wherein the step of depositing the side wall gap material comprises a first step of angular deposition to form a first side wall gap layer on a first side of the write pole, and a second step of angular deposition to form a second side wall gap layer on a second side of the write pole.

7. The method of claim 6, wherein the first and second steps of angular deposition comprise ion beam deposition.

8. The method of claim 6, wherein the first and second steps of angular deposition are each configured to have an angle whereby the lower region of the write pole is partially shadowed by one of the shadowing structures.

9. The method of claim 1, wherein the width of the deposited side wall gap layers linearly increases from the leading edge of the throat region to the trailing edge of the throat region.

10. The method of claim 1, wherein the deposited side wall gap layers have an outer surface opposite from the write pole, the outer surface having a smooth profile form the leading edge to the trailing edge of the threat regionlinearly increases from the leading edge of the throat region to the trailing edge of the throat region.

\* \* \* \* \*